(12) United States Patent
Nakamura et al.

(10) Patent No.: US 8,330,320 B2
(45) Date of Patent: Dec. 11, 2012

(54) SLIDING CONTACT MATERIAL, CLAD COMPOSITE MATERIAL, AND MOTOR

(75) Inventors: Keiji Nakamura, Chiba (JP); Makoto Takabatake, Chiba (JP); Hideyuki Uzawa, Chiba (JP); Masahiro Takahashi, Gunma (JP); Yoshinori Horiuchi, Gunma (JP); Takao Asada, Iwate (JP); Osamu Sakaguchi, Gunma (JP)

(73) Assignees: Mabuchi Motor Co., Ltd., Chiba (JP); Tanaka Kikinzoku Kogyo K.K., Tokyo (JP)

( * ) Notice: Subject to any disclaimer, the term of this patent is extended or adjusted under 35 U.S.C. 154(b) by 352 days.

(21) Appl. No.: 12/768,186

(22) Filed: Apr. 27, 2010

(65) Prior Publication Data
US 2010/0308688 A1 Dec. 9, 2010

(30) Foreign Application Priority Data
Jun. 5, 2009 (JP) .................................. 2009-136545

(51) Int. Cl.
*H01R 39/04* (2006.01)
(52) U.S. Cl. ........................................ 310/233; 428/632
(58) Field of Classification Search ................ 310/233; 428/632, 633, 673, 637
See application file for complete search history.

(56) References Cited

U.S. PATENT DOCUMENTS

| | | | |
|---|---|---|---|
| 5,728,194 A | 3/1998 | Weise et al. | 75/235 |
| 5,841,044 A | 11/1998 | Weise et al. | 75/232 |
| 6,245,166 B1 * | 6/2001 | Shibuya et al. | 148/431 |
| 7,160,632 B2 * | 1/2007 | Nakamura et al. | 428/673 |
| 2005/0116576 A1 * | 6/2005 | Nakamura et al. | 310/233 |

FOREIGN PATENT DOCUMENTS

| | | |
|---|---|---|
| JP | 06-220555 | 8/1994 |
| JP | 09-171734 | 6/1997 |
| JP | 09-171735 | 6/1997 |
| JP | 2005-154838 | 6/2005 |

OTHER PUBLICATIONS

Chemical Abstract 240525; Weise, Wolfgang, 1997.*

* cited by examiner

*Primary Examiner* — Nguyen N Hanh
(74) *Attorney, Agent, or Firm* — Roberts & Roberts, LLP

(57) ABSTRACT

[Problem to be Solved]
There is provided a highly wear-resistant and durable sliding contact material applicable to a commutator of a motor used for high-capacity applications in which the initial starting current (IS) is 1 ampere or higher.

[Solution]
The present invention provides a sliding contact material in which metal oxide particles are dispersed in an Ag alloy matrix, wherein the Ag alloy matrix is an Ag alloy containing 0.01 to 10.0 wt % of at least one kind of Fe, Co, Ni and Cu in Ag, and 0.1 to 3.0 wt % of a Ta oxide is dispersed as the metal oxide. In the present invention, 0.1 to 10.0 wt % of metal oxide particles of one kind or two or more kinds of Mg, Fe, Co, Ni and Zn may further be dispersed. The sliding contact material is used in a mode of clad composite material formed by embedding the sliding contact material in a part of a base material consisting of Cu or Cu alloy.

10 Claims, 2 Drawing Sheets

* The mean value of wear depth is indicated by a dot.

* The mean value of wear depth is indicated by a dot.

* The mean value of wear depth is indicated by a dot.

SLIDING CONTACT MATERIAL, CLAD COMPOSITE MATERIAL, AND MOTOR

TECHNICAL FIELD

The present invention relates to a sliding contact material suitable for a motor commutator performing electrical opening and closing by means of mechanical sliding operation. More particularly, it relates to a sliding contact material suitable for a high-capacity small electric DC motor whose initial starting current is 1 ampere or higher, which is used for an electrically-driven retractable mirror and the like of an automobile.

BACKGROUND ART

An automobile is mounted with many items of electrical equipment, such as audio equipment, an air conditioner damper, an electrically-driven retractable mirror, and a steering lock pin. To drive these items of electrical equipment, a large number of small electric DC motors are used, and an appropriate small electric DC motor is used depending on the torque necessary for driving each item of electrical equipment. The output torque of the small electric DC motor is proportional linearly to the input current. For the automobile, since the voltage applied to the motor is supplied from a battery having a fixed discharge voltage (13.5 V), a higher current must be carried to the motor for electrical equipment requiring a higher torque.

Therefore, the small electric DC motor for automotive electrical equipment is used appropriately according to its initial starting current (hereinafter, abbreviated to IS (Initial Start)). That is, the small electric DC motor used in such a manner that the IS is lower than 1 ampere is used for electrical equipment requiring a low torque, such as audio equipment and an air conditioner damper, and the small electric DC motor used for high-capacity applications in which the IS is 1 ampere or higher is used for electrical equipment requiring a high torque, such as an electrically-driven retractable mirror and a steering lock. For these motors, the kind and configuration of a sliding contact material used for a brush and a commutator are different depending on the current capacity.

The configuration of the small electric DC motor used for high-capacity applications in which the IS is 1 ampere or higher is generally such that a block-shaped carbon-based sintered material one side of which is several millimeters is used as the brush, a Cu-based material is used as the commutator, and the block-shaped sintered material is pressed against the commutator with a spring. In the high-capacity applications, since the carrying current is high, the brush side is greatly worn by a relatively high spark discharge produced when the brush separates from the commutator, or by an arc discharge. To solve this problem, by using carbon that has a low coefficient of dynamic friction against a metal and is less worn mechanically at the sliding time, the durability is assured, and further, by using a block-shaped brush material having a large volume, the wear is compensated.

The above-described motor for high-capacity applications in which the IS is 1 ampere or higher has great durability against current load; however, it has a problem that the rotation noise thereof is loud, and noise is generated frequently. The major cause for this is carbon, which is the brush material. Carbon is a material in which the minimum arc current is low, and is active in producing electric discharge, so that a spark discharge and an arc discharge are liable to be produced at the sliding time, and resultantly rotation noise and noise are liable to be generated. Also, one cause for this is the Cu-based material forming the commutator. The Cu-based material is liable to be corroded by environmental factors. Therefore, a film of oxides, sulfides, or the like is formed easily, so that the contact resistance tends to become unstable, which results in the generation of noise.

In the recent automobile industry, a tendency toward high grade has further increased, and therefore a motor of such quality that will generate less extra noise on a small part such as an electrically-driven retractable mirror and a steering lock tends to have the preferance. Also, on the recent automobile, the control systems for various items of electrical equipment, safety circuits, and the like have become complicated. In view of preventing the malfunction of these control systems as well, noise generation is unfavorable.

In the case where the reduction in rotational noise and noise is considered, as a countermeasures therefor, it has been contemplated to adopt a configuration similar to the small electric DC motor used for applications in which the IS is lower than 1 ampere is adopted. In this low-capacity motor, a sliding contact material of precious metal alloy is mainly used as the brush and the commutator, and is assembled to the motor as a mode of clad material in which the precious metal alloy is embedded in a base material consisting of Cu and Cu alloy. Also, the brush has a structure such that the above-described clad material fabricated into a plate shape or a rod shape is brought into contact with the commutator by utilizing the spring properties of the base material.

The motor using the precious metal alloy for the brush and the commutator as described above can be anticipated in suppressing noise because the precious metal has high discharge resistance, and therefore corrosion is less liable to be produced by environmental factors. Also, in addition to the viewpoint of the material characteristics, by using, on the brush side, the clad material consisting of the base material having spring properties, the follow-up properties of the brush following up the commutator are enhanced. Therefore, noise is also reduced from the structural viewpoint.

However, the motor using the precious metal alloy as described above can be used only for low-capacity applications (in which the IS is lower than 1 ampere). If such a motor is used for high-capacity applications (in which the IS is 1 ampere or higher), the motor stops before the required service life is reached. The mechanism for the stop of motor is thought as described below. For the precious metal alloy having high discharge resistance as well, electric discharge is somewhat produced, that is, spark discharge and arc discharge are produced at the moment when the brush separates from the commutator. This electric discharge melts and wears the slit part of the commutator (the end part of the commutator). Thereby, transfer is produced from the commutator to the non-sliding part of the brush, the transferred substance is again transferred to the slit part of the commutator, and is further transferred to the sliding part of the commutator, so that, finally, mechanical wear occurs between the transferred substances on the commutator. As a result, the brush is broken, and the motor stops before the required service life is reached.

From the above-described consideration concerning the mechanism for motor stop, it can be said that in order to enable the motor using the precious metal alloy to be used for high-capacity applications in which the IS is 1 ampere or higher, the sliding contact material forming the commutator must be restrained from melting and wearing. As for the configuration of the sliding contact material for the motor used for low-capacity applications, there have been known an AgPd alloy used for the brush, and an AgCu alloy described in Patent Literature 1 and an AgCuNiZnOMgO-based alloy obtained by improving the AgCu alloy, which is described in Patent Literature 2, the both being used for the commutator. The sliding contact material described in Patent Literature 2 is a material in which MgO and ZnO particles are dispersed in an AgCu alloy matrix so that these metal oxides achieve the lubricating effect in the sliding part to lower the frictional resistance and to improve the wear resistance. However, even if the sliding contact material whose characteristics are improved as described above is used, the material exhibits high wear resistance as compared with the AgCu alloy in high-capacity applications, but the motor will stop due to breakage of brush before the required service life is reached.

CITATION LIST

Patent Literature

[Patent Literature 1] Publication of Japanese Patent No. 3355380
[Patent Literature 2] Publication of Japanese Patent Application Laid-Open No. 2005-154838

SUMMARY OF INVENTION

Problem to be Solved by the Invention

The present invention has been made in view of the above background, and accordingly an object thereof is to provide a highly wear-resistant and durable sliding contact material applicable to a commutator of a motor used for high-capacity applications in which the IS is 1 ampere or higher, and also provide a small electric DC motor less liable to generate rotation noise and noise, which uses the sliding contact material.

Means for Solving the Problem

To solve the above object, the present invention provides a sliding contact material in which metal oxide particles are dispersed in an Ag alloy matrix, wherein the Ag alloy matrix is an Ag alloy containing 0.01 to 10.0 wt % of at least one kind of Fe, Co, Ni and Cu in Ag, and as the metal oxide, 0.1 to 3.0 wt % of a Ta oxide is dispersed. The content of the added elements in the Ag alloy matrix and the metal oxide is the ratio to the whole of the sliding contact material (hereinafter, the same is true).

The sliding contact material of the present invention is a material in which a metal oxide is dispersed with an Ag alloy being used as a matrix, and a Ta oxide ($Ta_2O_5$) is dispersed as the metal oxide. The Ta oxide has functions of improving the heat resistance of the slit part of commutator, reducing the melt and wear amount at the time of spark discharge and arc discharge, and restraining the transfer to the brush. The content of Ta oxide must be in the range of 0.1 to 3.0 wt %. If the content of Ta oxide is less than 0.1 wt %, the Ag alloy matrix cannot be strengthened sufficiently, so that the effect of reducing the melt and wear amount is deteriorated. On the other hand, if the content of Ta oxide exceeds 3.0 wt %, the workability at the time of raw material production is deteriorated significantly, and the material becomes impractical because of the increased manufacturing cost. Also, the contact resistance is raised by the occurrence of aggregation of Ta oxide, thereby reducing the endurance life. The preferable content of Ta oxide is 0.2 to 2.5 wt %.

The Ag alloy forming the matrix is an Ag alloy containing 0.01 to 10.0 wt % of at least one kind of Fe, Co, Ni and Cu in Ag. Each metal of Fe, Co, Ni and Cu dissolves as a solid solution or disperses in a particulate form in the Ag matrix, and has a function of reducing the mechanical wear and transfer of the sliding contact material. The metal content of Fe, Co, Ni and Cu is made 0.01 to 10.0 wt %. If the metal content is less than 0.01 wt %, the effect of reducing the wear resistance and transfer tends to decrease. On the other hand, if the metal content exceeds 10.0 wt %, the metal component is oxidized by heat generation due to friction at the sliding time, spark discharge and arc discharge, or the like, whereby an oxide film is formed on the surface of the commutator. The mechanical wear of brush material and the rise in contact resistance reduce the endurance life of motor. The preferable content of Fe, Co, Ni and Cu is 0.3 to 5.0 wt %. Among Fe, Co, Ni and Cu, Ni and Cu are especially preferable, and the alloy containing at least one kind of these two metals is preferable. At this time, it is preferable that the content of Ni be 0.3 to 1.0 wt %, and the content of Cu be 0.5 to 5.0%. It is further preferable that both of Cu and Ni be contained.

The sliding contact material of the present invention may be a material in which an oxide of one kind or two or more kinds of Mg, Fe, Co, Ni and Zn is further dispersed. These additional oxide particles achieve an effect of strengthening the Ag matrix and reducing the melt and wear of the commutator slit part by means of the synergy with the Ta oxide. The content of oxide of one kind or two or more kinds of Mg, Fe, Co, Ni and Zn is made 0.1 to 10.0 wt %. If the oxide content is less than 0.1 wt %, the effect of reducing the melt and wear of the commutator slit part is poor. On the other hand, if the oxide content exceeds 10.0 wt %, the workability is deteriorated significantly, and the contact resistance is raised by the aggregation of oxide. The preferable content of the additional metal oxide is 0.3 to 5.0 wt %. Among the oxides of Mg, Fe, Co, Ni and Zn, at least one kind of Mg oxide and Zn oxide is preferably dispersed.

In the case where the above-described sliding contact material of the present invention is used as the motor commutator, to make the construction material of commutator more suitable, the sliding contact material is preferably used as a clad composite material in which a base material consisting of Cu or Cu alloy is used, and the sliding contact material of the present invention is embedded in a part of the base material. By doing this, the solderability in soldering treatment necessary for electrically connecting the commutator is made excellent, and the workability at the time when the commutator shape is formed is also improved. Further, by adopting a mode of clad composite material, the thickness of the sliding contact material of the present invention embedded in the base material can be controlled in accordance with the motor used. Also, since the expensive sliding contact material has only to be used in a necessary part only, the motor can be made suitable in terms of cost.

For the above-described clad material, at least a part of the embedded sliding contact material may be covered with Au or Au alloy. An exposed portion of the surface of the sliding contact material of the clad material tends to be sulfurized easily because of being exposed to the atmosphere. Accordingly, by covering the sliding contact material with highly corrosion-resisting Au or Au alloy, the sulfurizing phenomenon of the sliding contact material can be prevented effectively. Also, Au or Au alloy is a good sliding contact material for realizing low contact resistance, and by using this material as a covering material, satisfactory motor driving can be performed. In this case, Au or Au alloy may be destroyed by wearing; however, since the sliding contact material of the present invention is present therein, there is no hindrance to the subsequent continuation of use.

Advantageous Effects of Invention

The sliding contact material of the present invention can be used suitably for the commutator of a motor used for high-capacity applications in which the IS is 1 ampere or higher, and is highly wear-resistant and durable. The motor incorporating the clad material as a commutator in which the sliding contact material of the present invention is embedded generates reduced noise as compared with the conventional motor used for high-capacity applications, and nevertheless has high durability. Regarding this noise reducing effect, for example, the mechanical noise of the conventional motor for an automotive electrically-driven retractable mirror is 40 to 48 dB, whereas the mechanical noise of the motor for an automotive electrically-driven retractable mirror, which uses the clad composite material in which the sliding contact material of the present invention is embedded, is 24 to 33 dB, so that quietness can be achieved.

For the motor in which the clad material having the sliding contact material of the present invention embedded therein is incorporated as the commutator, the material for the corresponding brush is not subject to any special restriction. However, the preferable brush material is an AgPd alloy (AgPd 50% alloy). The combination of this brush material and the sliding contact material of the present invention can reduce wear of both the materials with low noise, and can make the service life of motor preferable.

The sliding contact material of the present invention can be used for the commutator of not only the small electric DC motor used for electrical equipment mounted on an automobile, such as an air conditioner damper and audio equipment, in which the IS is less than 1 ampere but also the small electric DC motor used for household electrical appliances such as a CD player, a DVD player, a camera, and a shaver. In this case, the service life can be prolonged as compared with the case where the conventional sliding contact material is used.

EMBODIMENTS OF CARRYING OUT THE INVENTION

Figure 1:
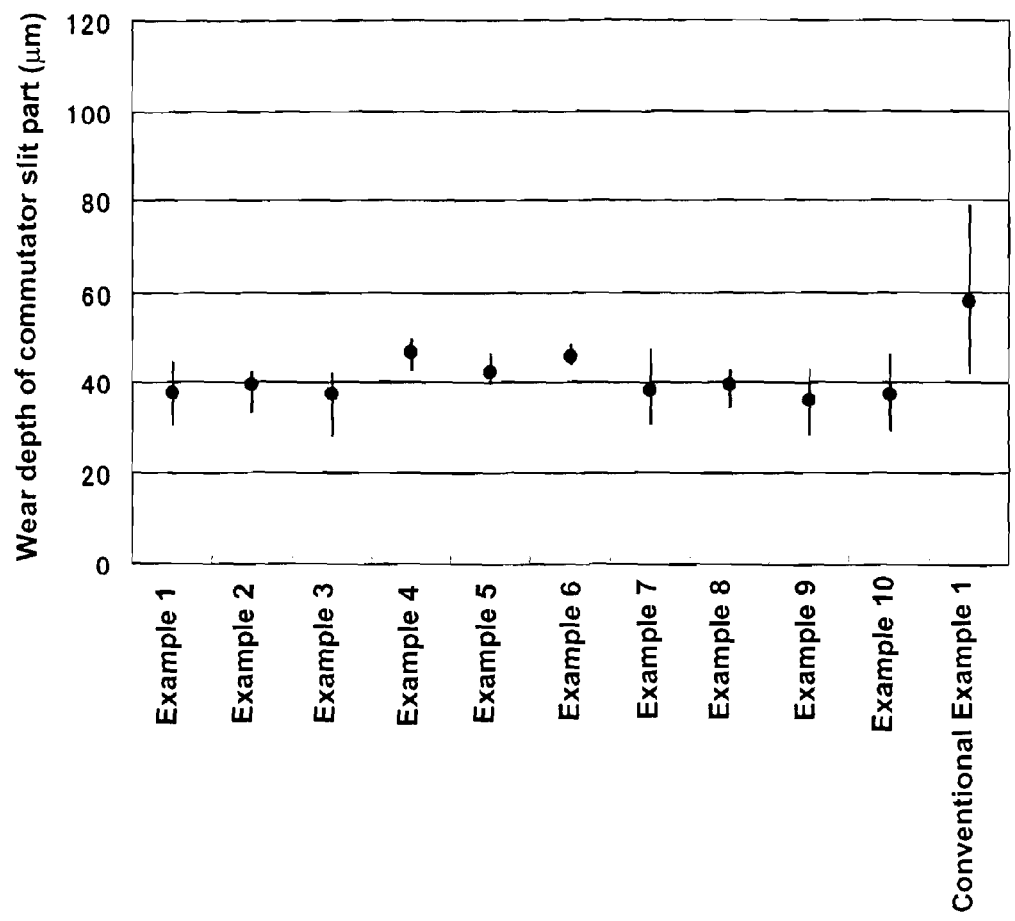
FIG. 1 is a diagram showing the result of wearing test (the commutator side) conducted in this embodiment.

A preferred embodiment of the present invention will be described on the basis of examples and a conventional example described below. In this embodiment, various kinds of sliding contact materials given in Table 1 were manufactured, and the properties thereof were compared.

TABLE 1

| | Material composition (wt %) | | | | | |
|---|---|---|---|---|---|---|
| | Cu | Ni | Ta oxide | Mg oxide | Zn oxide | Ag |
| Example 1 | 2.0 | 0.5 | 0.3 | — | — | Balance |
| Example 2 | 2.0 | 0.5 | 0.6 | — | — | Balance |
| Example 3 | 2.0 | 0.5 | 1.2 | — | — | Balance |
| Example 4 | 2.0 | 0.5 | 1.8 | — | — | Balance |
| Example 5 | 2.0 | 0.5 | 0.6 | — | 2.5 | Balance |

TABLE 1-continued

| | Material composition (wt %) | | | | | |
|---|---|---|---|---|---|---|
| | Cu | Ni | Ta oxide | Mg oxide | Zn oxide | Ag |
| Example 6 | 2.0 | 0.5 | 1.2 | — | 2.5 | Balance |
| Example 7 | 2.0 | 0.5 | 1.8 | — | 2.5 | Balance |
| Example 8 | 2.0 | 0.5 | 0.6 | 0.5 | — | Balance |
| Example 9 | 2.0 | 0.5 | 1.2 | 0.5 | — | Balance |
| Example 10 | 2.0 | 0.5 | 1.8 | 0.5 | — | Balance |
| Conventional Example 1 | 2.0 | 0.5 | — | 0.8 | 3.1 | Balance |

To manufacture the sliding contact material of Example 1, a powder mixture in which powders are dispersed evenly was prepared by mixing 2.0 wt % of Cu powder, 0.5 wt % of Ni powder, and 0.3 wt % of Ta oxide powder, and the balance of Ag powder for four hours by a ball mill. The powder mixture was packed in a cylindrical vessel, and was subjected to compression forming by applying a pressure of $4.9 \times 10^5$ N from the column lengthwise direction, whereby a columnar billet of 50 mm in diameter was formed. Successively, the columnar billet was subjected to vacuum (5.0 Pa) sintering at a temperature of 1123K for four hours. The compression forming and the sintering were repeated four times.

From the columnar billet subjected to the compression forming and vacuum sintering, a wire rod of 6.0 mm in diameter was formed by hot extruding. Successively, by repeating the wire drawing and annealing, a wire rod of 1.6 mm in diameter was formed.

As for each of the sliding contact materials of Examples 2 to 10 and Conventional Example 1 as well, a powder mixture having the composition given in Table 1 was prepared, and a wire rod of 1.6 mm in diameter was formed by being subjected to the same processings as those of Example 1.

The wire rod thus formed was fabricated into a tape shape by using a roller, and was inlay joined to a Cu material forming a base layer to obtain a clad composite material. Then, a two-layer clad composite material was manufactured by heat treatment at 1023K and repeated rolling.

Next, by using the manufactured clad composite material, a small electric DC motor was actually assembled, and a wearing test of the sliding contact material was conducted. The small electric DC motor was assembled by fabricating the clad composite material into a commutator. For the brush material, AgPd50 was embedded in a Cu alloy, and a two-layer clad composite material was fabricated into a brush. The conditions for the wearing test are given in Table 2.

TABLE 2

| | |
|---|---|
| Voltage | DC 13.5 V |
| Current | IS4A |
| Mode | Repetition of (1) and (2) |
| | (1) 0.1 sec (clockwise) - 2.4 sec (stop) |
| | (2) 0.1 sec (counterclockwise) - 2.4 sec (stop) |
| Brush material | AgPd50 |
| Load | 30 g-cm |
| Test time | 50,000 cycles |
| Test environment | 298K, 50% RH |
| Number of tests | 3 |

Figure 2:
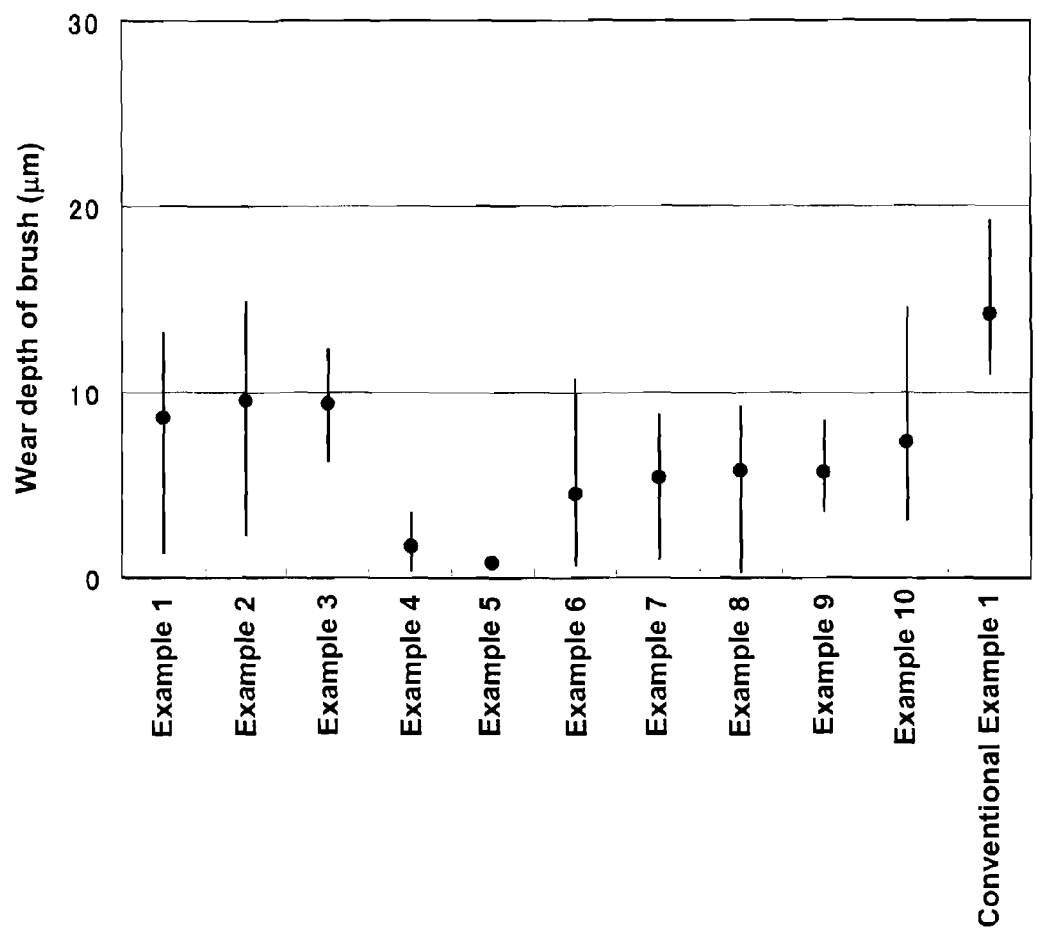
FIG. 2 is a diagram showing the result of wearing test (the brush side) conducted in this embodiment.

In the wearing test, the motor that had been rotated with the specified cycles was disassembled, the brush and commutator were taken out, and the wear depths of a commutator slit part and the brush were measured by using a contact roughness gauge. The results of wear depths measured on the motors of examples and conventional example are shown in FIGS. 1 and 2, and the mean values of wear depths are given in Table 3.

TABLE 3

| | Material composition (wt %) | | | | | Wear depth (mean value: μm) | |
|---|---|---|---|---|---|---|---|
| | Cu | Ni | Ta oxide | Mg oxide | Zn oxide | Ag | Commutator slit part | Brush |
| Example 1 | 2.0 | 0.5 | 0.3 | — | — | Balance | 37.5 | 8.6 |
| Example 2 | 2.0 | 0.5 | 0.6 | — | — | Balance | 39.3 | 9.6 |
| Example 3 | 2.0 | 0.5 | 1.2 | — | — | Balance | 37.2 | 9.4 |
| Example 4 | 2.0 | 0.5 | 1.8 | — | — | Balance | 46.5 | 1.7 |
| Example 5 | 2.0 | 0.5 | 0.6 | — | 2.5 | Balance | 42.1 | 0.8 |
| Example 6 | 2.0 | 0.5 | 1.2 | — | 2.5 | Balance | 45.6 | 4.4 |
| Example 7 | 2.0 | 0.5 | 1.8 | — | 2.5 | Balance | 38.0 | 5.3 |
| Example 8 | 2.0 | 0.5 | 0.6 | 0.5 | — | Balance | 39.3 | 5.7 |
| Example 9 | 2.0 | 0.5 | 1.2 | 0.5 | — | Balance | 35.8 | 5.6 |
| Example 10 | 2.0 | 0.5 | 1.8 | 0.5 | — | Balance | 37.2 | 7.3 |
| Conventional Example 1 | 2.0 | 0.5 | — | 0.8 | 3.1 | Balance | 58.0 | 14.2 |

From the wearing test result, it is found that concerning the wear depth of commutator slit part, in all of Examples 1 to 10, the wear depth decreases by 20% or more as compared with conventional example.

Concerning the wear depth of brush side, since the life required by the market in this application is 100,000 cycles, it is judged that the life requirement can be met if the brush wear depth under the test condition (50,000 cycles) is 15 μm or smaller. In this meaning, judging from the mean value in Table 3 only, it can be said that examples and conventional example are acceptable. However, as seen from FIG. 2, in conventional example, the brush wear depth sometimes exceeds 15 μm if including dispersion, whereas in Examples 1 to 10, the brush wear depth is kept at 15 μm or smaller even if including dispersion. Also, in all of Examples 1 to 10, the wear decreases by 30% or more as compared with Conventional Example 1. In particular, it is found that in Examples 5 to 7 in which Ta oxide and Zn oxide are added to the AgCuNi alloy and Examples 8 to 10 in which Ta oxide and Mg oxide are added, the wear decreases by 50% or more as compared with Conventional Example 1.

INDUSTRIAL APPLICABILITY

By using the clad composite material, in which the sliding contact material of the present invention is embedded, for a small electric DC motor, the wear of commutator slit part can be decreased significantly, and the brush wear caused by the wear of commutator slit part can also be suppressed significantly. Therefore, the sliding contact material of the present invention has sufficient durability in applications of high-capacity motor in which the IS is 1 ampere or higher.

What is claimed is:

1. A sliding contact material comprising metal oxide particles dispersed in an Ag alloy matrix, wherein the Ag alloy matrix is an Ag alloy containing 0.01 to 10.0 percent by weight of at least one of Ni and Cu in Ag, and 0.1 to 3.0 percent by weight of a Ta oxide is dispersed as the metal oxide.

2. The sliding contact material according to claim 1 wherein 0.1 to 10.0 percent by weight of metal oxide particles of at least one of Mg, Fe, Co, Ni and Zn are further dispersed in the Ag alloy matrix.

3. A clad composite material formed by embedding the sliding contact material according to claim 2 in a part of a base material comprised of Cu or Cu alloy.

4. A motor having a commutator, which commutator comprises the clad composite material according to claim 3.

5. A motor having a commutator, which commutator comprises the clad composite material according to claim 2.

6. A clad composite material formed by embedding the sliding contact material according to claim 1 in a part of a base material comprised of Cu or Cu alloy.

7. The clad composite material according to claim 6, wherein at least a part of the embedded sliding contact material is covered with Au or Au alloy.

8. A motor having a commutator, which commutator comprises the clad composite material according to claim 7.

9. A motor having a commutator, which commutator comprises the clad composite material according to claim 6.

10. A motor having a commutator, which commutator comprises the clad composite material according to claim 1.

* * * * *